US005416615A

United States Patent [19]

Shirota

[11] Patent Number: 5,416,615

[45] Date of Patent: May 16, 1995

[54] DIGITAL DATA TRANSMITTING APPARATUS

[75] Inventor: Norihisa Shirota, Kanagawa, Japan

[73] Assignee: Sony Corporation, Tokyo, Japan

[21] Appl. No.: 951,083

[22] Filed: Sep. 25, 1992

[30] Foreign Application Priority Data

Oct. 3, 1991 [JP] Japan ................................ 3-283630

[51] Int. Cl.[6] ............................................... H04N 7/30

[52] U.S. Cl. ................................ 358/530; 358/261.3; 358/427; 358/433; 358/524; 382/232

[58] Field of Search ............... 358/524, 133, 141, 426, 358/261.1, 261.2, 261.3, 427, 430, 432, 433, 135, 136; 375/122; 382/56

[56] References Cited

U.S. PATENT DOCUMENTS 4,941,194 7/1990 Shimura .
4,972,473 11/1990 Ejiri et al. ............................ 380/20
5,086,489 2/1992 Shimura .
5,140,417 8/1992 Tanaka et al. ...................... 358/133
5,249,066 9/1993 Fukuda et al. ...................... 358/433

FOREIGN PATENT DOCUMENTS 0385654 9/1990 European Pat. Off. .
0473384 3/1992 European Pat. Off. .

*Primary Examiner*—Bentsu Ro
*Attorney, Agent, or Firm*—William S. Frommer; Alvin Sinderbrand

[57] ABSTRACT

A digital data transmitting apparatus comprises: an original block forming circuit for extracting image data in horizontal direction and/or vertical direction at intervals of a predetermined number of samples and forming an original block consisting of (n×n) pixel data; a differential block forming circuit for forming a differential block consisting of (m×m) pixel data with differential data between adjacent pixel data in horizontal and/or vertical direction and the pixel data concerned; a coding circuit for transform coding the original block and the differential block, respectively; a flag generation circuit for transmitting meaningful data of coefficient data generated by transform coding the differential block and generating a flag representing omission of the transmission of coefficient data where there is no meaningful data; and a transmission circuit for transmitting the flag and the pixel data of each of the block.

12 Claims, 13 Drawing Sheets

DCT
SEL
S–BLOCK FORMING
C–FLAG GEN
C–FLAG
ABS
MAX DET
MUX
A0~A10
MEMORY
OUT
IN
MUX
MEMORY
OUT
IN
ADG
ADDRESS GEN
REQUANTIZING STEP SIZE
UPPER LIMIT VALUE
P
COMPARISON
Q
M
COEFFICIENT GEN
FORMATTING CIRCUIT
IN MEMORY OUT
1
2
3
4
5
6
7
8
9
10
11
21
22
23
24
25
26
27
28
29
30
31
32
33
34
35
36
37
38
39
40
41
42
43
44

Fig. 7A

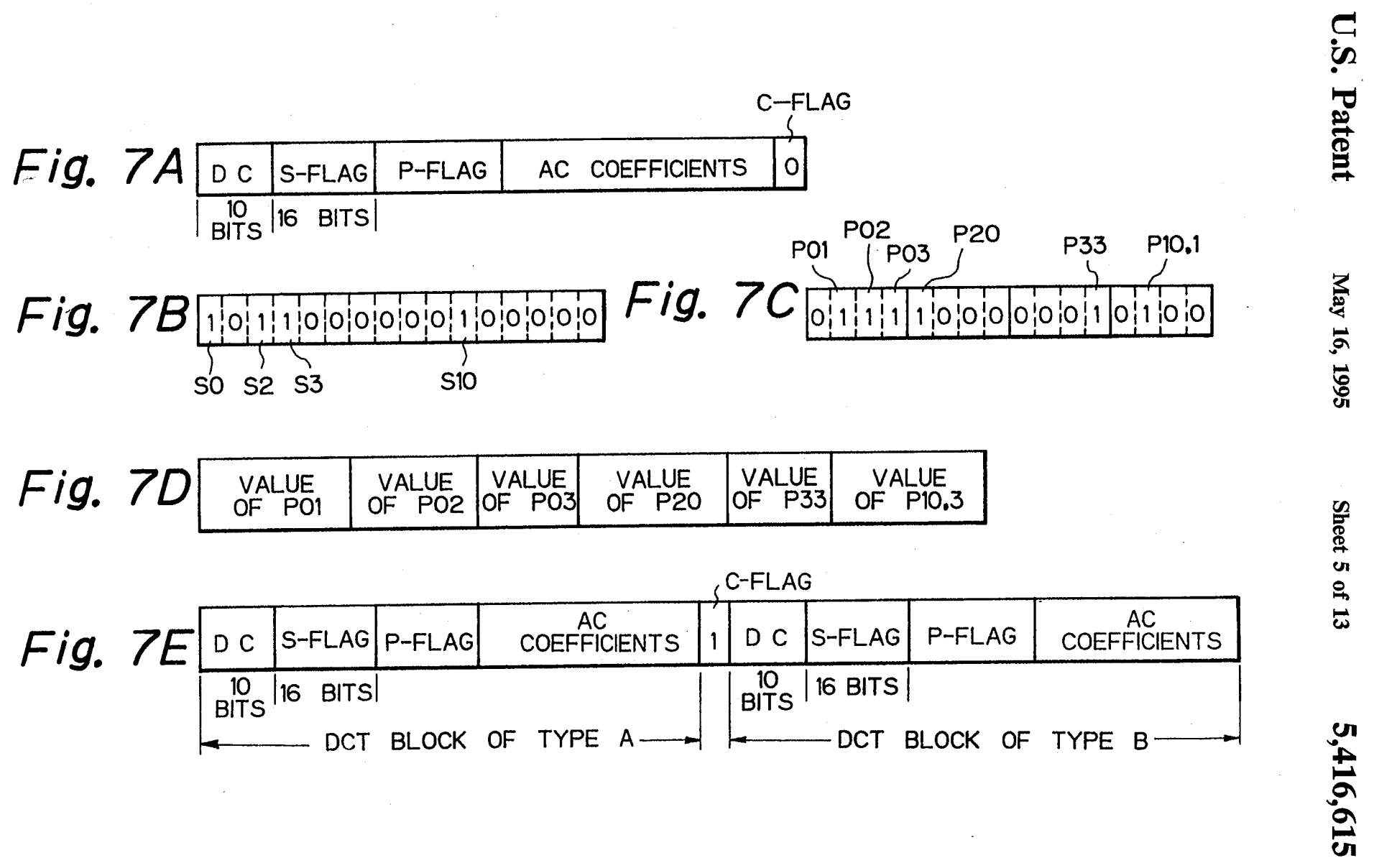

D C | S-FLAG | P-FLAG | AC COEFFICIENTS | 0

C-FLAG

10 BITS

16 BITS

VALUE OF P01 | VALUE OF P02 | VALUE OF P03 | VALUE OF P20 | VALUE OF P33 | VALUE OF P10,3

Fig. 7E

D C | S-FLAG | P-FLAG | AC COEFFICIENTS | 1 | D C | S-FLAG | P-FLAG | AC COEFFICIENTS

C-FLAG

10 BITS

16 BITS

DCT BLOCK OF TYPE A

10 BITS

16 BITS

DCT BLOCK OF TYPE B

Fig. 9A

| VALUE OF AC COMPONENT | NUMBER OF BITS | COEFFICIENT DATA |
|---|---|---|
| ± 1 | 1 | ± a0 |
| ± 2, 3 | 2 | ± a1 a0 |
| ± 4 ~± 7 | 3 | ± a2 a1 a0 |
| ± 8 ~±15 | 4 | ± a3 a2 a1 a0 |
| ±16~±31 | 5 | ± a4 a3 a2 a1 a0 |
| ±32~±63 | 6 | ± a5 a4 a3 a2 a1 a0 |
| ±64~±127 | 7 | ± a6 a5 a4 a3 a2 a1 a0 |

Fig. 9B

| COMMUNICATION DATA | NUMBER OF BITS |
|---|---|
| "1" S | 2 |
| "0" S "1" a0 | 4 |
| "0" S "0" a1 "1" a0 | 6 |
| "0" S "0" a2 "0" a1 "1" a0 | 8 |
| "0" S "0" a3 "0" a2 "0" a1 "1" a0 | 10 |
| "0" S "0" a4 "0" a3 "0" a2 "0" a1 "1" a0 | 12 |
| "0" S "0" a5 "0" a4 "0" a3 "0" a2 "0" a1 "1" a0 | 14 |

Fig. 12

| Q | 2 BITS | 4 BITS | 6 BITS | 8 BITS | 10 BITS | 12 BITS | 14 BITS | 16 BITS | 18 BITS | 20 BITS |
|---|---|---|---|---|---|---|---|---|---|---|
| 1 | 1 | 2 | 4 | 8 | 16 | 32 | 64 | 128 | 256 | 512 |
| 2 | 1 | 3 | 7 | 15 | 31 | 63 | 127 | 255 | 511 | 1023 |
| 4 | 2 | 6 | 14 | 30 | 62 | 126 | 254 | 510 | 1022 | |
| 6 | 3 | 9 | 21 | 45 | 93 | 189 | 381 | 765 | | |
| 8 | 4 | 12 | 28 | 60 | 124 | 252 | 508 | 1020 | | |
| 10 | 5 | 15 | 35 | 75 | 155 | 315 | 635 | | | |
| 12 | 6 | 18 | 42 | 90 | 186 | 378 | 762 | | | |
| 14 | 7 | 21 | 49 | 105 | 217 | 441 | 889 | | | |
| 16 | 8 | 24 | 56 | 120 | 248 | 504 | 1016 | | | |
| 20 | 10 | 30 | 70 | 150 | 310 | 630 | | | | |
| 24 | 12 | 36 | 84 | 180 | 372 | 756 | | | | |
| 28 | 14 | 42 | 98 | 210 | 434 | 882 | | | | |
| 32 | 16 | 48 | 112 | 240 | 496 | 1008 | | | | |
| 40 | 20 | 60 | 140 | 300 | 620 | | | | | |
| 48 | 24 | 72 | 168 | 360 | 744 | | | | | |
| 56 | 28 | 84 | 196 | 420 | 868 | | | | | |
| 64 | 32 | 96 | 224 | 480 | 992 | | | | | |

AC(n)
n
AC(4)
AC(12)
AC(28)
AC(60)
AC(124)
AC(252)
AC(508)
AC(1020)
1 2 3 4 5 6 7 8 9 10 11 12 13 14 15 16 17
28
60
124
252
508
1020 1023
2BITS
4BITS
6BITS
8BITS
10BITS
12BITS
14BITS
16BITS

Fig. 15

| i | Qi | VALUE OF xQk | | | | | | | | | | nQ |
|---|---|---|---|---|---|---|---|---|---|---|---|---|
| | | 2 BITS | 4 BITS | 6 BITS | 8 BITS | 10 BITS | 12 BITS | 14 BITS | 16 BITS | 18 BITS | 20 BITS | |
| 1 | 1 | 1 | 2 | 4 | 8 | 16 | 32 | 64 | 128 | 256 | 512 | 10 |
| 2 | 2 | 1 | 3 | 7 | 15 | 31 | 63 | 127 | 255 | 511 | 1023 | 10 |
| 3 | 4 | 2 | 6 | 14 | 30 | 62 | 126 | 254 | 510 | 1022 | | 9 |
| 4 | 6 | 3 | 9 | 21 | 45 | 93 | 189 | 381 | 765 | | | 8 |
| 5 | 8 | 4 | 12 | 28 | 60 | 124 | 252 | 508 | 1020 | | | 8 |
| 6 | 10 | 5 | 15 | 35 | 75 | 155 | 315 | 635 | | | | 7 |
| 7 | 12 | 6 | 18 | 42 | 90 | 186 | 378 | 762 | | | | 7 |
| 8 | 14 | 7 | 21 | 49 | 105 | 217 | 441 | 889 | | | | 7 |
| 9 | 16 | 8 | 24 | 56 | 120 | 248 | 504 | 1016 | | | | 7 |
| 10 | 20 | 10 | 30 | 70 | 150 | 310 | 630 | | | | | 6 |
| 11 | 24 | 12 | 36 | 84 | 180 | 372 | 756 | | | | | 6 |
| 12 | 28 | 14 | 42 | 98 | 210 | 434 | 882 | | | | | 6 |
| 13 | 32 | 16 | 48 | 112 | 240 | 496 | 1008 | | | | | 6 |
| 14 | 40 | 20 | 60 | 140 | 300 | 620 | | | | | | 5 |
| 15 | 48 | 24 | 72 | 168 | 360 | 744 | | | | | | 5 |
| 16 | 56 | 28 | 84 | 196 | 420 | 868 | | | | | | 5 |
| 17 | 64 | 32 | 96 | 224 | 480 | 992 | | | | | | 5 |

DIGITAL DATA TRANSMITTING APPARATUS

BACKGROUND OF THE INVENTION

1. Field of the Invention

The present invention relates to a digital data transmitting apparatus for transform coding a digital image signal by, for example, two-dimensional cosine transform (discrete cosine transform) to compress the amount of data and, more particularly to a digital data transmitting apparatus suitable for compressing the amount of transmission data.

2. Description of the Prior Art

To suppress the redundancy of an image signal, there has been known a transform coding technique for dividing a screen into blocks consisting of a particular number of pixels and performing linear transform of each block with a transform axis corresponding to the property of the original image signal. Examples of transform coding techniques are Hadamard transform, cosine transform, and so forth. In a conventional cosine transform coding apparatus, image data is divided into blocks consisting of (8×8) pixels and each block is cosine transformed (DCT transformed). Thus, (8×8=64) coefficient data is formed.

The coefficient data is output by the zigzag scanning from a DC component to high frequency components and then requantized. The requantized output signal is sorted in the order of absolute values of amplitudes. Thereafter, the amplitudes and addresses are differentiated. The differential signal is encoded into a code signal consisting of a particular number of bits by run-length coding technique or Huffman coding technique. This code signal is supplied to a buffer memory. The buffer memory is provided so as to transform the transmission rate of a code signal generated in a variable length coding process into a rate which does not exceed the rate of the transmission line for use. Although the input data rate of the buffer memory is variable, the output data rate thereof is nearly constant. The buffer memory detects the variation of the amount of transmission data. In response to the detection, the quantizing step in the requantizing process is controlled. In addition, the coefficient data to be transmitted is controlled so that it has a particular amount of data by a threshold operation in the variable length coding process. The threshold operation is a process for subtracting a predetermined threshold value from coefficient data whose absolute value is larger than the threshold value. However, the coefficient data of the DC component is excluded from the threshold operation.

In the conventional DCT transform, when the amount of information is compressed, while obtaining a particular bandwidth of images, fixed amount of information such as the DC component should be transmitted for all blocks. Since the fixed amount of information is not small, the ratio of data compression cannot be satisfactorily improved.

OBJECTS AND SUMMARY OF THE INVENTION

Therefore, an object of the present invention is to provide a digital data transmitting apparatus capable of reducing the amount of information, while obtaining a predetermined bandwidth of images.

According to another object of the present invention is to provide a method of transmitting digital data capable of reducing the amount of information, while obtaining a predetermined bandwidth of images.

According to an aspect of the present invention, there is provided a digital data transmitting apparatus comprising:

- an original block forming circuit for extracting image data in horizontal direction and/or vertical direction at intervals of a predetermined number of samples and forming an original block consisting of (n×n) pixel data;
- a differential block forming circuit for forming a differential block consisting of (m×m) pixel data with differential data between adjacent pixel data in horizontal and/or vertical direction and the pixel data concerned;
- a coding circuit for transform coding the original block and the differential block, respectively;
- a flag generation circuit for transmitting meaning data of coefficient data generated by transform coding the differential block and generating a flag representing omission of the transmission of coefficient data where there is no meaningful data; and
- a transmission circuit for transmitting the flag and the pixel data of each of the blocks.

According to another aspect of the present invention, there is provided a digital data transmitting apparatus according to claim 1, wherein the transform coded differential block is further divided into subblocks and meaningful coefficient data of each of the subblock is transmitted.

The above, and other, objects, features and advantage of the present invention will become readily apparent from the following detailed description thereof which is to be read in connection with the accompanying drawings.

BRIEF DESCRIPTION OF THE DRAWINGS

FIGS. 7A, 7B, 7C, 7D and 7E are schematic diagrams showing the format of transmission data;

FIGS. 9A and 9B are tables used to describe the code transformation of AC coefficients;

FIG. 12 is a table showing changes of numbers of bits of variable length codes according to requantizing step width.

FIG. 15 is a schematic diagram showing the relations of numeric values used in the flowchart of operation for controlling the amount of information generated.

DETAILED DESCRIPTION OF THE PREFERRED EMBODIMENTS

Now, with reference to the accompanying drawings, an embodiment of the present invention will be described.

Figure 1:
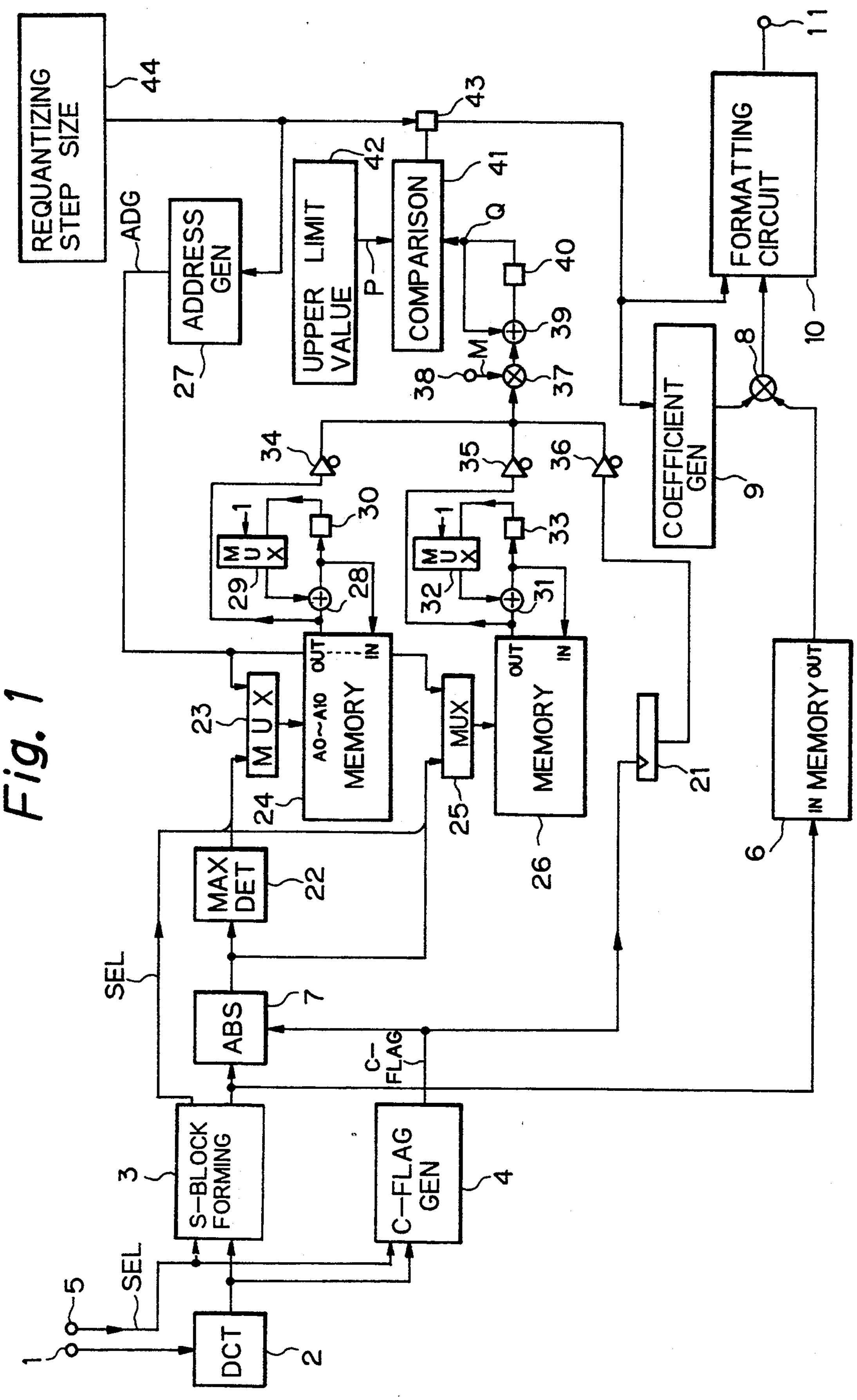
FIG. 1 is a block diagram of an embodiment of the present invention.
Figure 2:
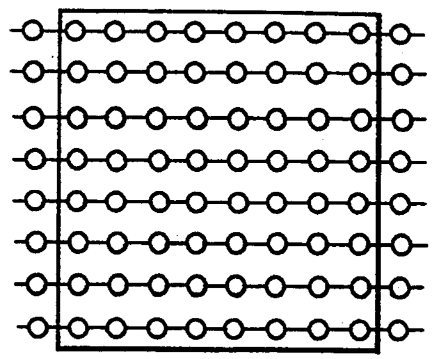
FIG. 2 is a schematic diagram used to describe a conventional DCT block.

In FIG. 1, a sampled and discrete image signal, that is, a digital image signal is supplied to an input terminal 1. The input digital image signal is supplied to a cosine transform circuit 2 including a block segmentation circuit. The block segmentation circuit transforms a digital image signal in a field or frame from a scanning sequence into a block sequence. Conventionally, as shown in FIG. 2, each DCT block formed a $(8\times8)$ two-dimensional block consisting of 8 pixels in horizontal direction and 8 lines in vertical direction. In the case of a field unit DCT block, all scanning lines shown in FIG. 2 are in the same field. In the case of a frame unit DCT block, scanning lines in even numbered fields and those in odd numbered fields are allocated one after the other.

Figure 3:
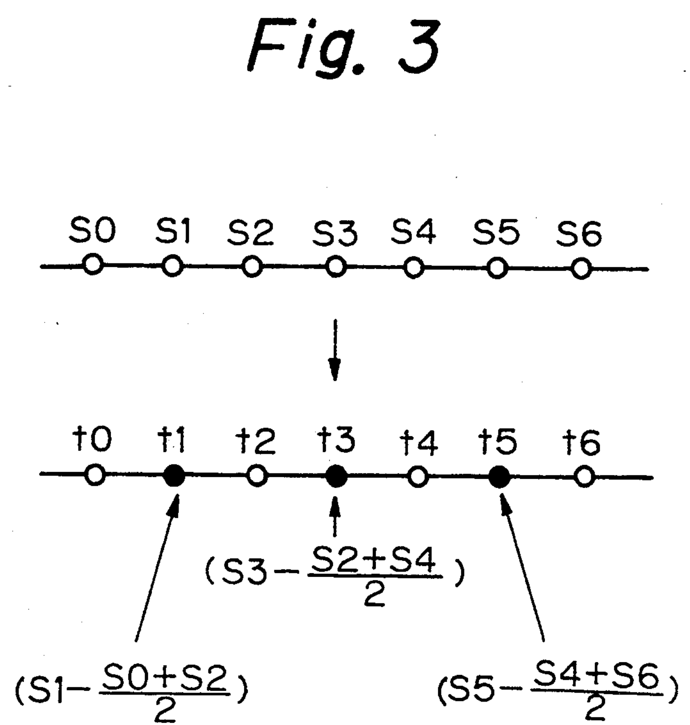
FIG. 3 is a schematic diagram used to describe a DCT block of the present invention.
Figure 4:
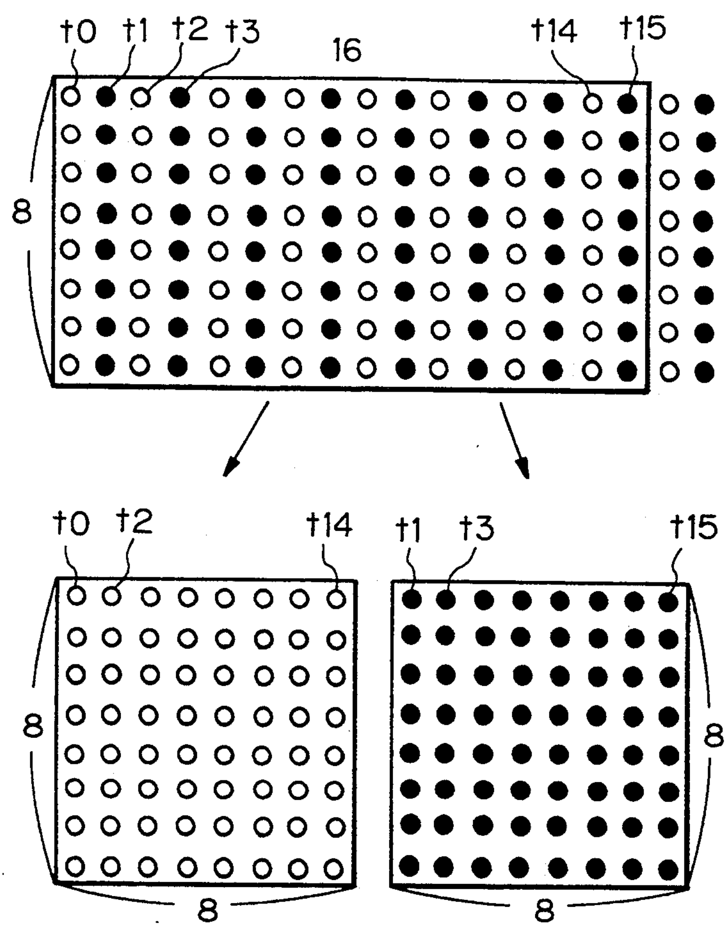
FIG. 4 is a schematic diagram used to describe the formation of DCT blocks of the present invention.

In the present invention, to further improve the compression ratio, a DCT block is formed as shown in FIGS. 3 and 4. Samples of original pixel data which are successive in horizontal direction are transformed into two sets of data sequences. In FIG. 3, S0, S1, S2, and so forth represent successive samples of the same scanning line. S0 is a first valid sample of the scanning line. These samples are transformed into a data sequence represented by the following formulas.

Even numbered data $t2i=S2i$

Odd numbered data $t2i+1=S2i+1-(S2i+S2i+2)/2$

In other words, even numbered data is the same as the original sample. Odd numbered data is the difference between the sample value and the average value of the preceding and following sample values. The odd numbered data is the difference between a value predictable from even numbered data and a real value.

The cosine transform circuit 2 transforms original data Si into the above-mentioned data ti and then stores the data ti in a field (or frame) memory. From this memory, data is read so as to form a $(8\times8)$ DCT block. As shown in FIG. 4, after the data ti is stored in the memory, data consisting of 16 samples in horizontal direction and 8 samples in vertical direction is divided into two sets of $(8\times8)$ two-dimensional data consisting of even numbered data t2i (white dots) and odd numbered data t2i+1 (black dots). The DCT block constructed of even numbered data is referred to as the DCT block of type A. The DCT block constructed of odd numbered data is referred to as the DCT block of type B. Since the DCT block of type B is differential data, the amount of information is small. In addition, even if the amount of information of the type B is remarkably compressed, the deterioration of the image quality is small. Thus, in comparison with the conventional system using only the DCT block shown in FIG. 2, the amount of information can be further compressed in the invention. In addition to the differential data in the horizontal direction described in this example, it should be understood that differential data in the vertical direction can be formed.

The cosine transform circuit 2 performs two-dimensional cosine transform for the DCT blocks of types A and B. From the cosine transform circuit 2, $(8\times8)$ coefficient data corresponding to the size of each DCT block is obtained. Coefficient data of the DC component consists of 10 bits including one sign (±) bit. Coefficient data of AC components consists of 8 bits including one sign (±) bit.

The coefficient data of the cosine transform circuit 2 is supplied to a subblock (S-block) forming circuit 3 and a C-flag generation circuit 4. These circuits receive a select signal SEL from an input terminal 5. The select signal SEL is a pulse signal for identifying a DCT block of type A and a DCT block of type B. Data transformed from time sequence by the S-block forming circuit 3 is supplied to a memory 6. The memory 6 is used to delay by one frame which is a unit period of the buffering process.

The coefficient data of the memory 6 is supplied to a multiplier 8 constructing a requantizing circuit. The multiplier 8 receives a division coefficient according to the quantizing step width from a coefficient generator 9. This coefficient is the inverse number of the quantizing step width. Thus, the multiplier 8 substantially performs a division. The requantizing circuit (consisting of the multiplier 8 and the coefficient generator 9) is provided for performing a buffering process (controlling the amount of information). The requantizing circuit requantizes data with a controlled quantizing step width so that the amount of data to be transmitted per frame (the number of bits to be transmitted) does not exceed a predetermined value. For example, in the case that the maximum value of the division coefficient is 1, as the division coefficient decreases to such as $\frac{1}{2}$, $\frac{1}{4}$, $\frac{1}{8}$, 1/16, 1/32, 1/64, and so forth, the amount of data to be transmitted decrease. The buffering operation is performed only for the data of AC components (AC coefficients). For the data of DC component (DC coefficient) which is important, the original data is transmitted.

The quantizing step width and the data of the multiplier, 8 are supplied to a formatting circuit 10. Transmission data is generated from an output terminal 11 of the formatting circuit 10. The transmission data is sent to a transmission line. An example of the transmission line is a magnetic recording/reproducing process. The formatting circuit 10 performs required processes such as transforming codes of AC coefficients, adding transmission synchronous patterns, and encoding with error correction. Processes such as calculating the number of transmission bits can be performed while input data is absent (in vertical blanking intervals). Data being read from the memory 6 in the next frame interval is requantized with the step width determined in the preceding frame.

Figures 5A, 5B, 5C:
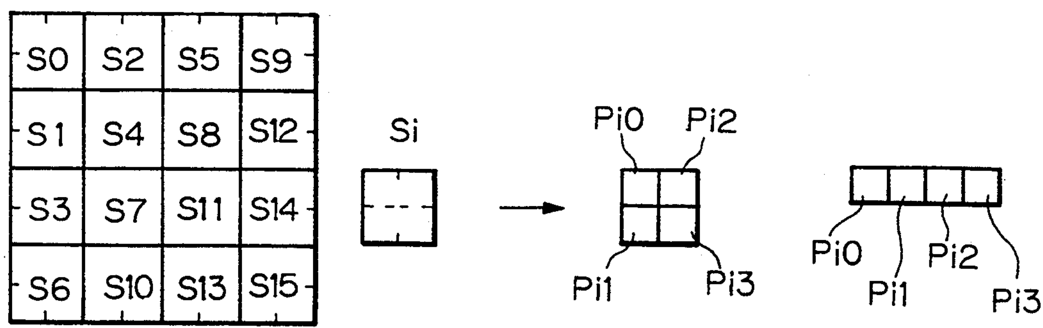
FIGS. 5A, 5B and 5C are schematic diagrams used to describe a flag representing whether meaningful data is present or absent.
Figure 6:
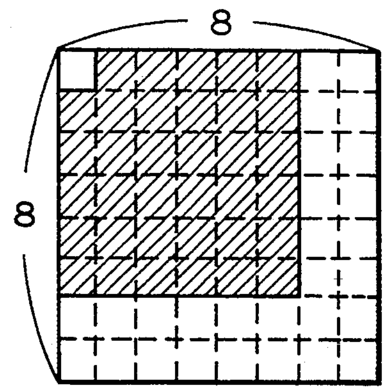
FIG. 6 is a schematic diagram used to describe the generation of a C-flag.
Figure 8:
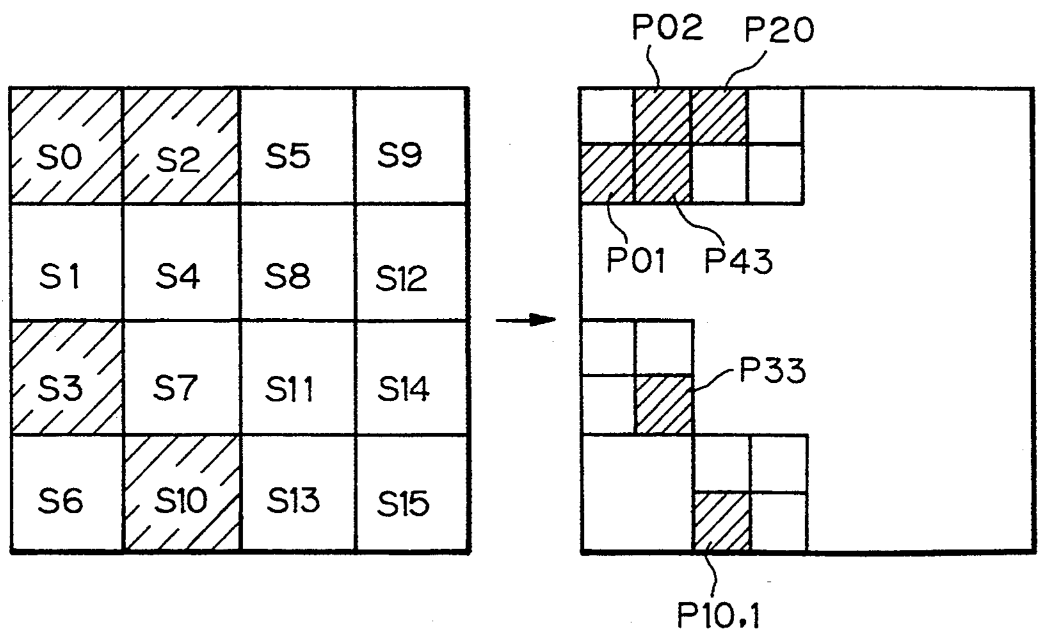
FIG. 8 is a schematic diagram of a real example used to describe the format of transmission data.

Next, the formats of S-blocks, flags, and transmission signals except for the buffering process will be described. When coefficient data of the cosine transform circuit 2 is transmitted, respective coefficient data generated from DCT data of types A and B are encoded together into transmission data. To compress the amount of information of the transmission data, a flag representing whether meaningful data is present or absent is used. In other words, as shown in FIG. 5A, (8×8) coefficient data consisting is divided into 16 (2×2) subblocks (referred to as S-blocks). For each S-block, S-flags S0 to S15 consisting of 16 bits are defined. When at least one sample to be transmitted, that is, at least one meaningful sample is present in four samples of an S-block, Si=1 is defined. When all data are 0, Si=0 is set.

As shown in FIG. 5B, each S-block contains four samples. For the samples in an S-block, P-flag bits Pi0, Pi1, Pi2, and Pi3 are defined. Like the S-flag, for the P-flag, with respect to the data to be transmitted, Pij=1 is set. With respect to the data of value 0, i.e., the data which is not needed to transmit, Pij=0 is set. Four P-flags bits in one S-block are transmitted in the order shown in FIG. 5C. It should be noted that an S-block can be formed by diving a DCT block in a zigzag scanning sequence in addition to equally dividing the block in the vertical and horizontal directions.

In the present invention, for the data of a DCT block of type B, a C-flag is formed. The meaning of the C-flag is as follows.

When C=1 is set, data of a DCT block of type B paired with a DCT block of type A preceding the C-flag is transmitted in the same format as the DCT block of type A.

When C=0 is set, data of a DCT block of type B is not transmitted.

Thus, the more frequency the case of C=0 takes place, the more the amount of information is compressed.

The C-flag is generated by comparing the sum of the absolute values of data of a DCT block of type B with a predetermined threshold value. For example, the absolute values of the data of the hatched portion excluding the DC component and the high order AC components in data of a DCT block of type B are summed. When this sum is equal to or larger than the threshold value, C=1 is set. When the sum is smaller than the threshold value, C=0 is set. In this process, the C-flag generation circuit 4 generates the C-flag. For a portion where successive three samples are linearly varied in an image signal sequence Si, C=0 can be set, and it is only needed to transmit the C-flag consisting of one bit. Thus, the amount of information can be remarkably compressed.

FIG. 7A represents the construction of transmission data of a block of type A in the event that (C=0) is set. In transmission data, DC component data DC of 10 bits is followed by an S-flag of 16 bits, followed by a variable-length P-flag. The DC component data and the S-flag of 16 bits are always transmitted. These flags are followed by AC coefficient data of a DCT block of type A, followed by a C-flag of 1 bit.

Next, the transmission data will be described in more detail. As an example, with respect to data of a DCT block of type A, the case where the subblocks and samples being hatched are meaningful data will be described. In this example, as shown in FIG. 7B, in accordance with the meaningful subblocks, an S-flag where the respective values of S0, S2, S3, and S10 are 1 is generated. In addition, as shown in FIG. 7C, in accordance with the meaningful samples, a P-flag where the respective values of P01, P02, P03, P20, P33, and P10,1 are 1 is generated. FIG. 7D shows AC coefficient data in accordance with each sample. The AC coefficient data is code-transformed by the formatting circuit 10 and then transmitted.

When data of a DCT block of type B is transmitted in addition to data of a DCT block of type A, a transmission format shown in FIG. 7E is used. The transmission data of a block of type A is followed by a C-flag (where C=1 is set), followed by transmission data of a block of type B. Like a block of type A, a DC component of 10 bits is followed by an S-flag of 16 bits, followed by a variable length P-flag, followed by AC coefficient data.

AC coefficient data obtained by the cosine transform consists of eight bits including one sign (±) bit. This AC coefficient data is transformed into a transmission signal by the formatting circuit 10 as shown in FIG. 9. FIG. 9A shows values and codes of AC coefficients of coefficient data obtained by the DCT. In the figure, ai represents (i−1)th bit of AC coefficient data. As shown in FIG. 9B, this coefficient data is transformed into transmission data in a bit pattern where the number of bits is incremented by 2 as the bit number increases.

The bit pattern of transmission data consists of a sign bit S placed in the head and original bits in which a connection bit "0" or "1" is placed between each original bit. "0" of the sign bit S represents +, whereas "1" thereof represents −. "1" of the connection bit is added before the last bit. Thus, the bit sequence ends with ("1" S) or ("1" a0). The end of the bit sequence can be detected. On the receive side, the transmission data can be decoded into coefficient data.

The coefficient data of the S-block forming circuit 3 is supplied to the memory 6 and an absolute value calculation circuit 7. The C-flag from the C-flag generation circuit 4 is supplied to the absolute value calculation circuit 7 and a counter 21. The data transformed into absolute values by the absolute value calculation circuit 7 is supplied to a maximum value detection circuit 22 and a multiplexer 25. The maximum value detection circuit 22 detects the maximum value of absolute values of AC coefficients for each S-block. The output of the maximum value detection circuit 22 is supplied to a multiplexer 23. The outputs of the multiplexers 23 and 25 are supplied to the memories 24 and 26 as the respective addresses A0 to A10.

The memories 24 and 26 are provided to generate respective frequency distribution tables for use in the buffering process and to store them. In other words, the memory 24 stores a frequency distribution of maximum values in an S-block of AC coefficients transformed into absolute values. The maximum values are cumulative in one frame interval and then a cumulative frequency distribution table is formed. On the other hand, the memory 26 stores a frequency distribution of AC coefficients transformed into absolute values. The absolute values are cumulated in one frame interval and then a cumulative frequency distribution table is formed.

The data read from the memory 24 is supplied to an adder 28. The adder 28 adds the received data and the output of a multiplexer 29. The multiplexer 29 receives 1 and an output signal of a register 30. One of these input signals is selectively supplied to the adder 28. An output signal of the adder 28 is supplied to the register 30 and the memory 24. Data being read from the memory 26 is supplied to an adder 31. The adder 31 adds the received data and the output of a multiplexer 32. The multiplexer 32 receives +1 and an output signal of a register 33. One of these input signals is selectively supplied to the adder 31. An output signal of the adder 31 is supplied to a register 33 and the memory 26.

In addition, the output signal of the memory 24, the output signal of the memory 26, and a count value of the counter 21 are supplied to a multiplier 37 through gates 34, 35, and 36, respectively. The multiplier 37 receives a multiplication factor M from a terminal 38. When the gate 34 is turned on and an output signal of the gate 34 is supplied to the multiplier 37, the multiplication factor M is set to 4. When the gate 35 is turned on and the output signal of the gate 35 is supplied to the multiplier 37, the multiplication factor M is set to 2. When the gate 36 is turned on and the output signal of the gate 36 is supplied to the multiplier 37, the multiplication factor M is set to 26. The output of the multiplier 37 is supplied to an adder 39. The adder 39 is connected to a register 40. The output of the register 40 is fed back to the adder 39.

The register 40 outputs the number of transmission bits Q which will be described later. The number of transmission bits Q is supplied to a comparison circuit 41. The comparison circuit 41 receives an upper limit value P of the amount of transmission information from a circuit 42. The comparison circuit 41 detects the relation between Q and the target value P. When the relation ($P \geqq Q$) is detected, a comparison output signal, which is for example in high level, is generated. As will be described later, the amount of information is controlled in such a way that the requantizing step width is successively varied from the state where the requantizing step width is small and therefore the amount of information generated is large so as to decrease the amount of information generated. When the state ($P < Q$) is changed to ($P \geqq Q$), it is determined that the requantizing step width is appropriate.

A comparison output signal of the comparison circuit 41 is supplied to a register 43 as a clock for latching a signal therein. The register 43 latches the input signal with the comparison output signal which is generated when the relation ($P \geqq Q$) is satisfied. The register 43 receives an output signal of a requantizing step width generation circuit 44. The output signal of the requantizing step width generation circuit 44 is supplied to an address generation circuit 27. An address ADG from the address generation circuit 27 is supplied to the multiplexers 23 and 25. In addition, the output signal of the register 43 is supplied to the division coefficient generation circuit 9 and the formatting circuit 10.

Next, the process for obtaining the number of transmission bits Q in the above-mentioned embodiment will be described. The number of transmission bits contains amount of fixed information and amount of variable information. The amount of fixed information is the amount of information which should be always transmitted for every image. In a DCT block of type A, the DC component (of 10 bits) and the S-flag (of 16 bits) are the amount of fixed information. In a DCT block of type B, the C-flag (of 1 bit) is the amount of fixed information. On the other hand, in a DCT block of type A, the P-flag and the AC coefficients are the amount of variable information (when calculated every frame interval). In a DCT block of type B ($C=1$), the DC component (of 10 bits), the S-flag (of 16 bits), the P-flag, and the AC coefficients are the amount of variable information (when calculated every frame interval).

The amount of information generated of the DC component and the S-flag of a DCT block of type B can be readily calculated. In other words, the number of occurrences where ($C=1$) is satisfied in one frame interval is counted by the counter 21. Thereafter, the count value is multiplied by ($10+16=26$). The result is the amount of information generated.

Calculation of amount of information of P-flag (types A and B):

With respect to DCT blocks of type A, the following calculations are performed for all DCT blocks in one frame. On the other hand, with respect to DCT blocks of type B, the following calculations are performed only for DCT blocks where ($C=1$) is satisfied in one frame.

Figure 10A:
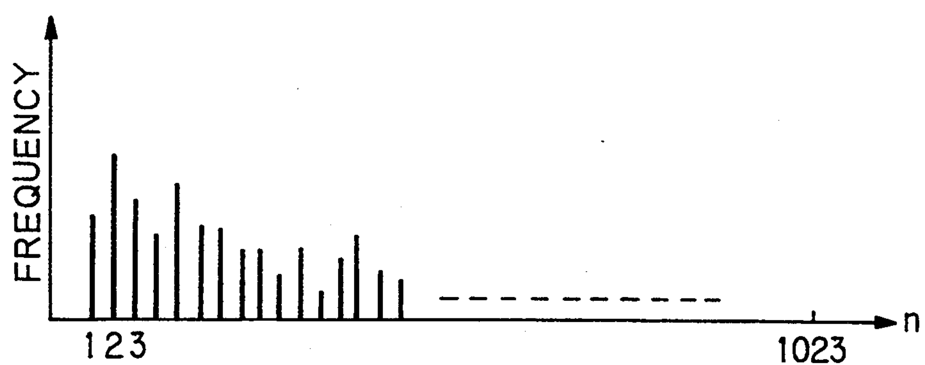
FIGS. 10A and 10B are schematic diagrams showing respective examples of a frequency distribution table and a cumulative frequency distribution table for use in calculating the amount of information generated of P-flag.
Figure 10B:
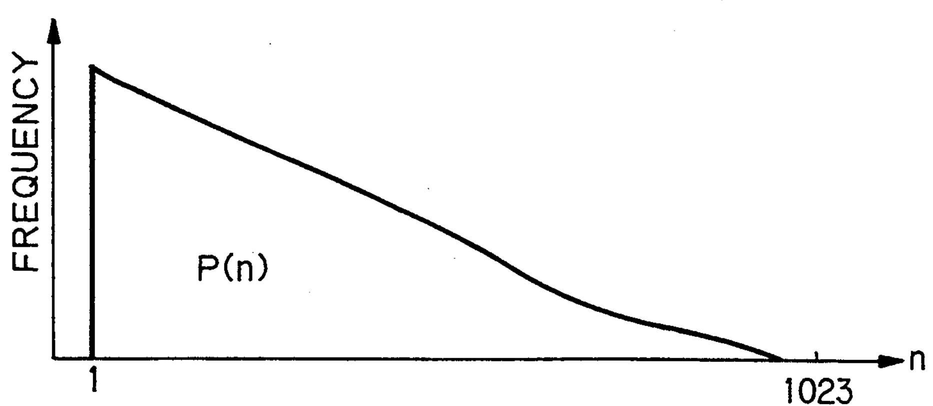

When there is at least one non-zero value in four samples of an S-block as AC coefficient data, the P-flag should be transmitted. Thus, by determining the maximum value of the AC coefficient data of each S-block, the necessity of transmission of the P-flag can be satisfactorily known. Thus, a frequency distribution table listing the maximum values of absolute values of AC coefficients of all S-blocks in one frame is created. Thereafter, the frequency distribution table is transformed into a cumulative frequency distribution table. FIG. 10A shows a frequency distribution table where the maximum value of absolute values of AC coefficients of each S-block is plotted on horizontal axis (address n) and the occurrence frequency thereof is plotted on vertical axis. Then, the frequency is successively cumulated from the maximum value of the address n on the frequency distribution table in the descending order. Thus, a cumulative frequency distribution table P(n) shown in FIG. 10B is created.

When the minimum value n0 to be transmitted is determined, by using this cumulative frequency distribution table P(n), the number of bits of the P-flag to be transmitted can be calculated by the following formula.

$$P(n0) \times 4 \text{ (bits)}$$

As an example, AC coefficients of a DCT block are requantized with quantizing step width=8. In other words, all the AC coefficients are set to $\frac{1}{8}$. Thereafter, the results are subjected to counting fractions over $\frac{1}{2}$ as one and disregarding the rest. If the maximum value of absolute values of AC coefficients of each S-block is 4 or more, the S-block which has been requantized contains a meaningful value(s). Thus, when AC coefficients are requantized by 8, the minimum value to be transmitted is ($n0=4$). Thus, the amount of information generated of the P-flag is expressed as follows:

$$P(4) \times 4 \text{ (bits)}$$

When the cumulative frequency distribution table of DCT blocks of type A is represented with Pa(n), that of DCT blocks of type B where ($C=1$) is satisfied with Pb(n), and their requantizing step widths with Qa and Qb, the amount of information generated of the P-flag can be given by the following formula.

$$\{Pa(Qa/2)+Pb(Qb/2)\} \times 4 \text{ (bits)}$$

where in the case of (Qa and $Qb=1$), ($Qa/2$ and $Qb/2=1$).

Calculation of the amount of information generated of AC coefficients:

Like the calculations of the amount of information generated of the P-flag, the following calculations are performed for all DCT blocks of type A in one frame and for DCT blocks of type B where ($C=1$) is satisfied in one frame.

Figure 11:
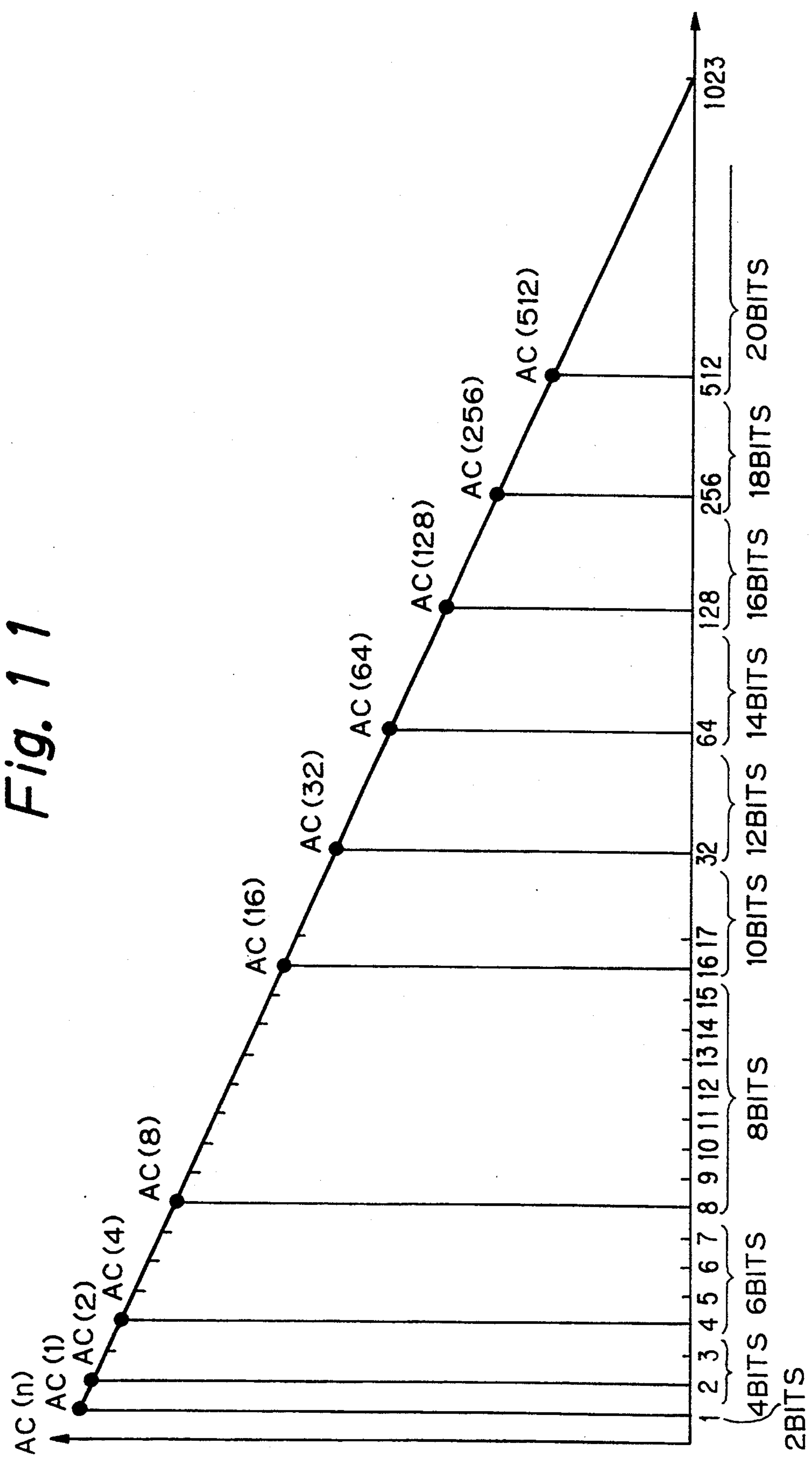
FIG. 11 is a schematic diagram showing an example of a cumulative frequency distribution table for use in calculating the amount of information generated of AC coefficients.

First, a frequency distribution table where absolute values of all AC coefficients of each DCT block are addresses is created. Then, in the same manner as the P-flag, a cumulative frequency distribution table AC(n) is created. As the result, an example shown in FIG. 11 is obtained. If the requantizing step width (Q) is 1, that is, the requantizing step width is set so that the original data can be obtained after requantization process, the following results are obtained from FIG. 11.

| AC coefficient | No. of bits necessary for transmission | No. of coefficients generated |
|---|---|---|
| ±1 | 2 | AC(1)–AC(2) |
| ±2 and ±3 | 4 | AC(2)–AC(4) |
| ±4 to ±7 | 6 | AC(4)–AC(8) |
| ±8 to ±15 | 8 | AC(8)–AC(16) |
| ±16 to ±31 | 10 | AC(16)–AC(32) |
| ±32 to ±63 | 12 | AC(32)–AC(64) |
| ±64 to ±127 | 14 | AC(64)–AC(128) |
| ±128 to ±255 | 16 | AC(128)–AC(256) |
| ±256 to ±511 | 18 | AC(256)–AC(512) |
| ±512 to ±1023 | 20 | AC(512) |

Thus, the amount of information generated of AC coefficients where the requantizing step width is 1, AC1, is given by the following formula.

$$AC1 = 2 \times \{AC(1) - AC(2)\} + 4 \times \{AC(2) - AC(4)\} + 6 \times \{AC(4) - AC(8)\} + 8 \times \{AC(8) - AC(16)\} + \ldots + 18 \times \{AC(256) - AC(512)\} + 20 \times AC(512)$$

Then, consider the case where the requantizing step width (Q) is 8. Original values where AC coefficients are divided by 8 and subjected to counting fractions over ½ as one and disregarding the rest become change points 1, 2, 4, 8, and so forth of the number of transmission bits are important. FIG. 12 shows this relation. This table shows original values where AC coefficients are requantized with various requantizing step widths (Q=1, 2, 4, and so forth) and the number of bits is varied. As shown by a box of FIG. 12, when (4, 12, 28, 60, 124, 252, 508, 1020) are requantized by (Q=8), (1, 2, 4, 8, 16, 32, 64, and 128) are obtained, respectively. Thus, the amount of generated information of AC coefficients of (Q=8), AC8, can be expressed by the following formula.

$$AC8 = 2 \times \{AC(4) + AC(12) + AC(28) + AC(60) + AC(124) + AC(252) + AC(508) + AC(1020)\}$$

Figure 13:
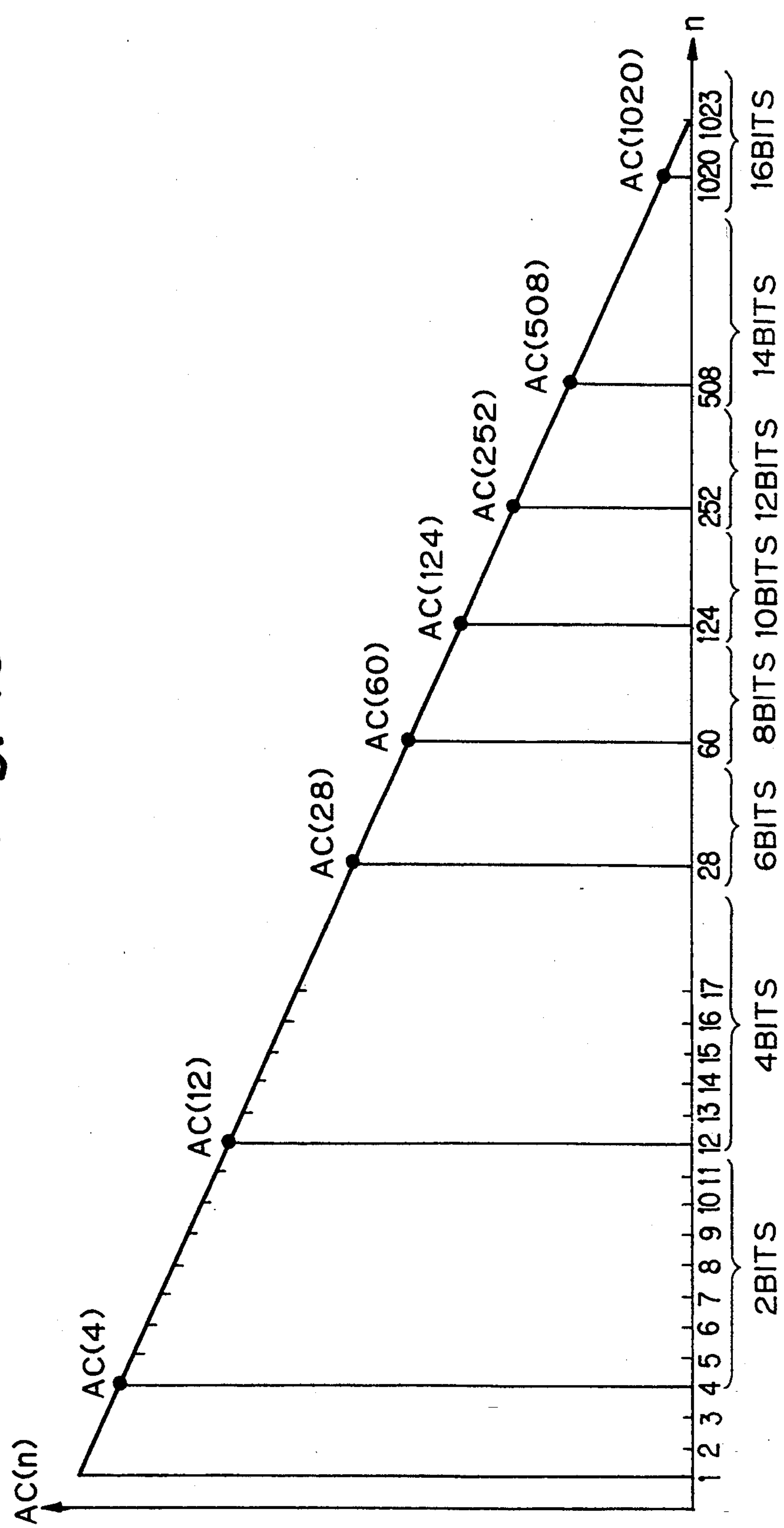
FIG. 13 is a schematic diagram showing another example of the cumulative frequency distribution table for use in calculating the amount of information generated of AC coefficients.

FIG. 13 shows a cumulative frequency distribution table representing this relation.

When the change point of the number of bits of variable length code according to the requantizing step width Q is represented with xQi, in the examples of (Q=1) and (Q=8), the change point can be represented as follows.

$$x11 = 1, x12 = 2, x13 = 4, x14 = 8, x15 = 16, \ldots$$
$$x81 = 4, x82 = 12, x83 = 28, x84 = 60, x85 = 124,$$
$$x86 = 252, x87 = 508, x88 = 1020$$

As described above, the sum of the amount of variable information can be expressed by the following formula.

$$\text{Amount of variable information} = 26 \times nB + \{Pa(Qa/2) + Pb(Qb/2)\} \times 4 + 2\{\Sigma ACa(xQai) + \Sigma ACb(xQbj)\}$$

where nB: the number of DCT blocks of type B where (C=1) is satisfied,

Pa( ): a cumulative frequency distribution table of maximum values of S-blocks of type A, Pb( ): a cumulative frequency distribution table of maximum values of S-blocks of type B where (C=1) is satisfied, Σ: the sum with respect to i or j, Qa and Qb: the numbers of requantized bits of DCT blocks of types A and B, respectively, ACa( ): a cumulative distribution table of AC coefficients of DCT blocks of type A, and ACb( ): a cumulative distribution table of AC coefficients of DCT blocks of type B where (C=1) is satisfied.

Next, the way of calculations of the amount of information generated, which are performed by the circuit shown in FIG. 1, will be described. The amount of information is controlled roughly in the following four stages.

In the first stage, a clear operation is performed. The contents of the memories 24 and 26 are cleared and the counter 21 is zero-reset. When the clear operation is performed, the adders 28 and 31 generate zero-data. The 11-bit address ADG which changes time by time is supplied from the address generation circuit 27 to the memories 24 and 26 through the multiplexers 23 and 25, respectively. The address ADG is changed to (0, 1, 2, . . . , 2047) and thereby zero-data is written to all the addresses.

As the second stage, the clear operation is followed by a frequency distribution table generation operation. The multiplexers 23 and 25 select the maximum value, detected by the maximum value detection circuit 22, and the absolute values of AC coefficients. The multiplexers 23 and 25 receive a select signal SEL as the most significant bit A10 of a relevant address. The select signal SEL which is "0" represents that the input data is a DCT block of type A. On the other hand, the select signal SEL which is "1" represents that the input data is a DCT block of type B.

The multiplexers 29 and 32 select a +1 input. Data of an address designated by the maximum value and the absolute value of an AC coefficient is read from the memories 24 and 26. The adders 28 and 31 increment the address by +1. The output data of the adders 28 and 31 are written to the same address as the input data of the memories 24 and 26. The data is written to the memory 24 every four samples. On the other hand, the data is written to the memory 26 every sample. After this process is performed in one frame interval, respective frequency distribution tables are stored in the memories 24 and 26. Whenever a DCT block of type B where (C=1) is satisfied is input, the value of the counter 21 is incremented by +1.

After the respective frequency distribution tables for one frame are formed in the memories 24 and 26, as the third stage, with these frequency distribution tables, cumulative frequency distribution tables are formed. To create the cumulative frequency distribution tables, the multiplexers 23 and 25 are switched so as to select the address ADG from the address generation circuit 27. In addition, the multiplexers 29 and 32 are switched so as to select the respective outputs of the registers 30 and 33. After the registers 30 and 33 are zero-cleared, when A10 of ADG is 0, each value of A0 to A9 decreases in the order of 1023, 1022, . . . , 3, 2, 1, and 0. The memories 24 and 26 write data whenever the address changes. Next, in the state of (A10=1), each value of A0 to A9 decreases in the order of 1023, 1022, . . . , 3, 2, 1, and 0. In this way, in the first half of the process where (A10=0) is satisfied, cumulative frequency distribution tables Pa(n) and Aca(n) are created in the memories 24 and 26, respectively. In the second half process where (A10=1) is satisfied, cumulative frequency distribution tables Pb(n) and ACb(n) are created in the memories 24 and 26, respectively.

In the fourth stage, a calculation process for the amount of information generated is performed. By using different requantizing step widths for type A and type B, respectively, the amount of information can be controlled. However, in this example, for both the types, the same requantizing step width is used. In this operation period, the multiplexers 23 and 25 are switched so as to select the address ADG from the address generation circuit 27. In addition, the multiplexers 29 and 32 are switched so as to select the outputs of the registers 30 and 33, respectively.

Figure 14A:
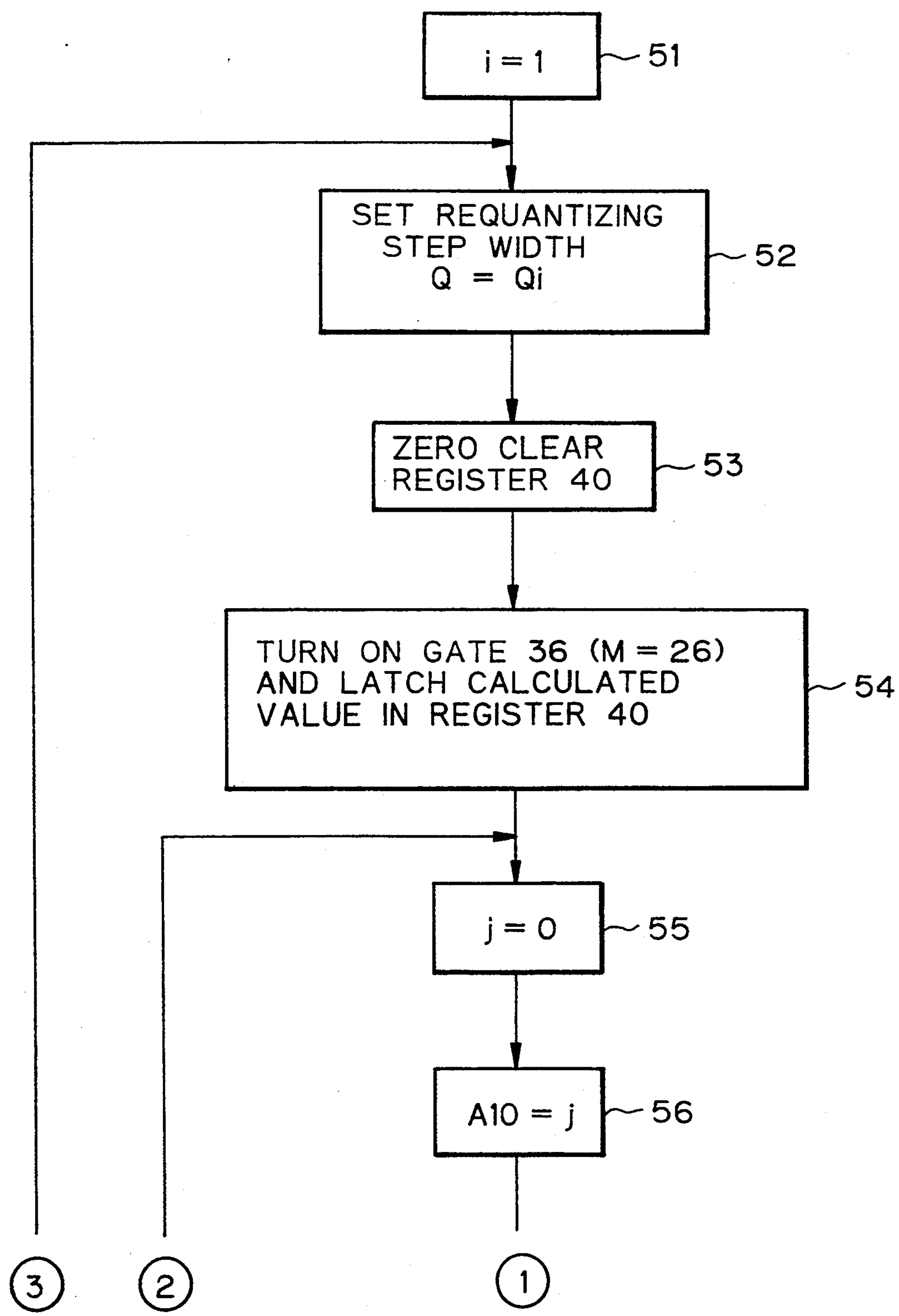
FIG. 14A and 14B are a flowchart of operation for controlling the amount of information generated.
Figure 14B:
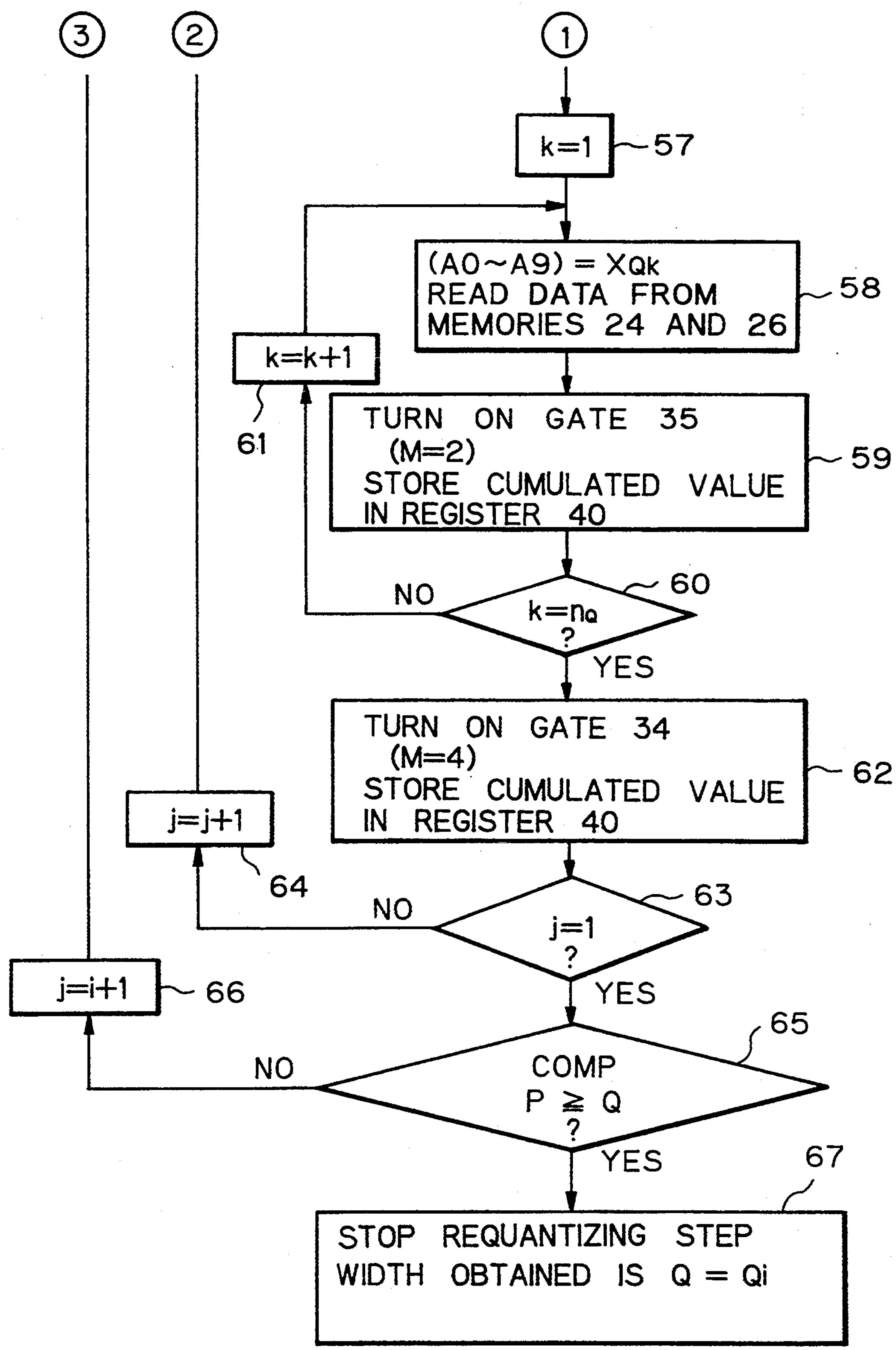

FIG. 14 is a flowchart showing the flow of calculations of the amount of information generated. FIG. 15 shows the relations of numeric values i, Qi, nQ, and xQk in the flowchart.

First of all, (i=1) is set (in step 51). Next, the requantizing step width Q is set to Qi (Q1 starts with 1) (in step 52). Then, the register 40 is zero-cleared (in step 53). Thereafter, the gate 36 is turned on. The multiplication factor M of the multiplier 37 is set to 26 (M=26). The register 40 latches the calculated value (in step 54). In the step 54, multiplications for a total of 26 bits of the DC component and S-flags are performed with respect to the number of DCT blocks of type B where (C=1) is satisfied.

The flow advances to step 55. (j=0) is set. In the next step (step 56), the most significant bit A10 of the address is set to j (A10=j). When (j=0), DCT blocks of type A are calculated. When (j=1), DCT blocks of type B are calculated. In step 57, (k=1) is set.

In step 58, A0 to A9 of address are set to xQk. Data are read from the memories 24 and 26. For example, when (i=6), that is, (Q=Q6=10), from the table shown in FIG. 15, (nQ=7). As k increases, xQk decreases as (xQ1=635, xQ2=315, xQ3=155, xQ4=75, xQ5=35, xQ6=15, xQ7=5). The address ADG is generated in such an order.

In the next step 59, the gate 35 is turned on. The multiplication factor M is set to 2 (M=2). The register 40 stores the cumulated value. Next, the flow advances to step 60 where the determination of (k=nQ?) is performed. Until the relation of (k=nQ) is satisfied, the steps 58 and 59 are repeated through step 61 where the operation of (k=k+1) is performed. While k=1 to nQ, the amount of information of AC coefficients is calculated.

When the relation of k=nQ is satisfied in the step 60, the flow advances to step 62. In the step 62, the gate 34 is turned on. The multiplication factor M is set to 4 (M=4). The register 40 stores the cumulated value. In the step 62, the amount of information of P-flag is calculated. In step 63 which is a determination step, the determination of (j=1) is performed. When (j=0), the amount of information of DCT blocks of type A is calculated. When (j=1), the amount of information of DCT blocks of type B is calculated. Thus, when the relation of (j=1) is satisfied in the step 63, the calculation of the amount of information generated is completed. When the relation of (j=1) is not satisfied in the step 63, the flow returns back to the step 55 through the step 64 where the operation of (j=j+1) is performed.

When the relation of (j=1) is satisfied in the step 63, the flow advances to comparison step 65. In this step, the relation of (P≧Q) is determined. When this relation is not satisfied, that is, the amount of information generated Q is larger than the-upper limit value P, the operation of (i=i+1) is performed in step 66 and the flow returns back to step 52. Thus, the requantizing step width Qi increases in the order of (Q1=1, Q2=2, Q3=4, Q4=8, and so forth) and thereby the amount of information accordingly decreases. When the relation of P≧Q is satisfied in the step 65, the flow stops and it is determined that the desired requantizing step width Q is Qi. The determined requantizing step width is sent to the register 43 and then supplied to the coefficient generation circuit 9 and the formatting circuit 10 as described above.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

For examples, it should be appreciated that the requantizing step width is not limited to the above-mentioned numeric values. In addition, by using image data of one field, the cosine transform and the amount of information can be controlled. In addition to the control system of the amount of information described in the embodiment, other systems which use a flag representing the presence or absence of meaningful data can be employed. Besides two-dimensional blocks, the present invention can be also applied to transform coding of three-dimensional blocks. Moreover, the input image signal for use in the present invention can be a component color picture signal as well as a television luminance signal. Further, components can be simultaneously or separately processed. Furthermore, in addition to DCT transform codes, other orthogonal transform codes can be used.

In the present invention where original image data blocks and differential data blocks are constructed as orthogonal transform code blocks, by omitting the transmission of differential data blocks, the compression rate of data can be improved without tradeoff of deterioration of image quality. In the above-mentioned embodiment, since the amount of data transmitted can be reduced to a value smaller than the target value by feed-forward control, problems such as oscillation do not take place as opposed to feed-back control technique. In this information amount control technique, the amount of data can be precisely controlled in the unit of field, frame, or the like. Thus, this system can be suitably applied to digital VTRs. In addition, since this information amount control technique does not require a complicated circuit such as a sorting circuit or the like, the circuit scale does not become large.

What is claimed is:

1. A digital data transmitting apparatus comprising:

an original block forming circuit for extracting image data in horizontal direction and/or vertical direction at intervals of a predetermined number of samples and forming an original block consisting of (n×n) pixel data;

a differential block forming circuit for forming a differential block consisting of (m×m) pixel data with differential data between adjacent pixel data in horizontal and/or vertical direction and the pixel data concerned;

a coding circuit for transform coding said original block and said differential block, respectively;

a flag generation circuit for transmitting meaningful data of coefficient data generated by transform coding said differential block and generating a flag representing omission of the transmission of coefficient data where there is no meaningful data; and a transmission circuit for transmitting said flag and said pixel data of each of said blocks.

2. A digital data transmitting apparatus according to claim 1, wherein said transform coded differential block is further divided into subblocks, and wherein meaningful coefficient data of each of said subblocks is transmitted.

3. A digital data transmitting apparatus according to claim 1 or 2, wherein said image data is extracted every other sample.

4. A digital data transmitting apparatus according to claim 1 or 2, wherein said original block and said differential block are coded together into transmission data when said flag is in the first state and only said original block is coded into transmission data when said flag is in the second state.

5. A digital data transmitting apparatus according to claim 4, wherein by extracting said image data at intervals of said predetermined number of samples, said original block is formed with even numbered pixel data of pixel data being successive in horizontal direction or vertical direction which is extracted as it is, and said differential block is formed with odd numbered pixel data of pixel data being successive in horizontal direction or vertical direction which is equal to differential data between a value predictable from said even numbered pixel data as said adjacent pixel data and the pixel data concerned.

6. A digital data transmitting apparatus according to claim 5, wherein said value predictable from said even numbered pixel data is the average value of the preceding and following sample values.

7. A digital data transmission apparatus according to claim 5, wherein said flag is formed in the data of said differential block constructed of said odd numbered pixel data, and the data of said differential block constructed of said odd numbered pixel data is paired with said original block constructed of said even numbered pixel data preceding said flag, said differential block is transmitted in the same format as said original block when said flag is in said first state.

8. A digital data transmitting apparatus according to claim 5, wherein said first state is a state in which the sum obtained by summing the absolute values of the data excluding the DC component and the high order AC components in the data of said differential block constructed of said odd numbered pixel data, is equal to or larger than a predetermined threshold value.

9. A digital data transmitting apparatus according to claim 1, wherein n is equal to m.

10. A digital data transmitting apparatus according to claim 1, wherein said transform coding is DCT.

11. A digital data transmitting apparatus according to claim 1, wherein said digital data transmitting apparatus is used for a digital VTR.

12. A method of transmitting digital data, comprising the steps of:

extracting image data in horizontal direction and/or vertical direction at intervals of a predetermined number of samples and forming an original block consisting of (n×n) pixel data;

forming a differential block consisting of (m×m) pixel data with differential data between adjacent pixel data and in horizontal direction and/or vertical direction and the pixel data concerned;

transform coding said original block and said differential block, respectively;

transmitting meaningful data of coefficient data generated by transform coding said differential block and generating a flag representing omission of the transmission of coefficient data where there is no meaningful data.

* * * * *